United States Patent [19]
Lohmann et al.

[11] Patent Number: 5,817,412
[45] Date of Patent: Oct. 6, 1998

[54] LOW-SEALING, BIAXIALLY ORIENTED POLYOLEFIN MULTILAYER FILM, PROCESS FOR ITS PRODUCTION AND ITS USE

[75] Inventors: Harald Lohmann, Neunkirchen; Herbert Peiffer, Mainz; Detlef Busch, Saarlouis, all of Germany

[73] Assignee: Hoechst Trespaphan GmbH, Germany

[21] Appl. No.: 755,489

[22] Filed: Nov. 22, 1996

[30] Foreign Application Priority Data

Nov. 23, 1995 [DE] Germany .................. 195 43 679.2

[51] Int. Cl.⁶ .................................................. B32B 27/32
[52] U.S. Cl. .......................... 428/336; 428/515; 428/516
[58] Field of Search .................... 428/336, 515, 428/516

[56] References Cited

U.S. PATENT DOCUMENTS

| | | | |
|---|---|---|---|
| 4,375,989 | 3/1983 | Makinen .................. | 106/300 |
| 4,447,271 | 5/1984 | Howard et al. ........... | 106/300 |
| 4,502,263 | 3/1985 | Crass et al. .............. | 53/396 |
| 4,622,237 | 11/1986 | Lori ......................... | 427/40 |
| 4,652,489 | 3/1987 | Crass et al. .............. | 428/337 |
| 4,698,261 | 10/1987 | Bothe et al. ............. | 428/204 |
| 4,720,420 | 1/1988 | Crass et al. .............. | 428/216 |
| 5,236,622 | 8/1993 | Yoneda et al. ........... | 252/309 |
| 5,236,680 | 8/1993 | Nakazawa et al. ...... | 423/328.1 |
| 5,302,427 | 4/1994 | Murschall et al. ...... | 428/34.2 |
| 5,372,882 | 12/1994 | Peiffer et al. ........... | 428/34.9 |
| 5,695,840 | 12/1997 | Mueller .................. | 428/35.7 |

FOREIGN PATENT DOCUMENTS

| | | |
|---|---|---|
| 0 114 312 | 8/1908 | European Pat. Off. . |
| 0 044 515 | 1/1982 | European Pat. Off. . |
| 0 078 633 | 5/1983 | European Pat. Off. . |
| 0 180 087 | 5/1986 | European Pat. Off. . |
| 0 184 094 | 6/1986 | European Pat. Off. . |
| 0 187 253 | 7/1986 | European Pat. Off. . |
| 0 236 945 | 9/1987 | European Pat. Off. . |
| 0 480 282 | 4/1992 | European Pat. Off. . |
| 0 578 149 | 1/1994 | European Pat. Off. . |
| 0 611 647 | 8/1994 | European Pat. Off. . |
| 3801535 | 7/1988 | Germany . |

*Primary Examiner*—D. S. Nakarani
*Attorney, Agent, or Firm*—Connolly & Hutz

[57] ABSTRACT

A polyolefinic multilayer film comprises at least three layers BIT, wherein B is a polyolefinic base layer, I is an intermediate layer, and T is a top layer applied to the intermediate layer I. The intermediate layer I comprises at least 75% by weight, based on the weight of the intermediate layer I, of heat sealable polyolefins. The top layer T comprises at least 75% by weight, based on the weight of the top layer T, of heat sealable polyolefins. The minimum sealing temperature of the polyolefin of top layer T is at least 100° C. and is greater than the minimum sealing temperature of the polyolefin of the intermediate layer I. The thickness of the top layer T is less than 0.4 μm.

11 Claims, No Drawings

LOW-SEALING, BIAXIALLY ORIENTED POLYOLEFIN MULTILAYER FILM, PROCESS FOR ITS PRODUCTION AND ITS USE

Low-sealing, biaxially oriented polyolefin multilayer film, process for its production and its use

BACKGROUND OF THE INVENTION

The invention relates to a polyolefinic multilayer film having at least three layers BIT, where B is a polyolefinic base layer, I is an intermediate layer and T is a top layer applied to the intermediate layer. The invention furthermore relates to the use of this film and to a process for its production.

The increasingly fast packaging machines as well as sensitive contents (food, chocolate, bakery products) require films having a low initial sealing temperature in combination with optimum running behavior on the machine. The prior art discloses films which have initial sealing temperatures below 100° C. and in some cases even down to 74° C. However, these films have major disadvantages in their production.

EP-A-0 114 331 and EP-A-0 114 312 describe opaque and transparent polypropylene films having an initial sealing temperature (minimum sealing temperature) of less than 100° C. and good running behavior on the machine. These films have a top layer of a mixture of $C_2/C_3/C_4$-terpolymer and $C_3/C_4$-copolymer and a low molecular weight resin, polypropylene homopolymer and polydiorganosiloxane. According to this teaching, the large sealing range of the film and the low initial sealing temperature are achieved by the olefin resin composition comprising copolymer and terpolymer. The incorporation of hydrocarbon resins into the top layer leads to resin deposits on the stretching rolls during production. These deposits result in streaking on the film. The rolls must be frequently cleaned in order to avoid the streaks.

EP-A-0 184 094 and EP-A-0 187 253 describe transparent and opaque polypropylene films which have a sealable surface layer with an initial sealing temperature of less than or equal to 100° C. and a second surface layer which is non-sealable. The minimum initial sealing temperature of below 100° C. is achieved by the olefin resin composition comprising $C_3/C_4$-copolymers and $C_2/C_3/C_4$-terpolymers.

EP-A0 480 282 describes a biaxially oriented polyolefin multilayer film which has a low sealing temperature on both sides and whose base layer contains a peroxidically degraded propylene homopolymer and whose top layers contain mixtures of $C_2/C_3/C_4$-terpolymer and $C_2/C_3$-copolymer and a combination of $SiO_2$ and polydialkylsiloxane. The polydialkylsiloxane is highly viscous and is added in the form of a masterbatch. The initial sealing temperature is 88° C.

EP-A-0 578 149 describes a low-sealing, transparent, coextruded polyolefin multilayer film having defined longitudinal and transverse shrinkages, whose top layers have an initial sealing temperature of 124° C., preferably from 80° to 110° C.

EP-A-0 611 647 describes multilayer films having at least one low-sealing top layer. The top layer contains a $C_3/C_4$-olefin resin composition of low crystallinity and has an initial sealing temperature of less than 84° C.

At elevated temperature, films having the described low-sealing top layers have a strong tendency to stick to one another and to hot machine parts, such as, for example, stretching rolls of the longitudinal orientation unit or clip chains of the transverse orientation unit. The production of such films is therefore extremely problematic. Because of the high tendency of the film to stick, it tendency to tear is particularly high. In the case of film tears during longitudinal orientation, sticking of the film web to itself or to the stretching rolls causes the film to wind around the rolls and to bend and damage them. When tears occur during transverse orientation, pieces of film remain adhering in the clip chains and must be removed from the frame with considerable effort. This involves long downtimes. Furthermore, film tears give rise to a greater danger of accidents as a result of the still warm film web sticking to itself. The film web collapses like an accordion and sticks together to form a relatively long strand which can be removed from the machine only with considerable effort.

It is therefore the object of the invention to provide a multilayer film which has good sealing properties, i.e. in particular has a low initial sealing temperature to make it suitable for use also for heat-sensitive packed goods and on high-speed packaging machines. The film should not stick to itself and to the heated machine parts during production and should run without problems during production. Furthermore, the film must not stick to itself when tears occur in the film.

SUMMARY OF THE INVENTION

According to the invention, this object is achieved by a film of the generic type stated at the outset, whose characterizing features are that the intermediate layer I contains at least 75% by weight, based on the intermediate layer I, of sealable polyolefins and the top layer T contains at least 75% by weight, based on the top layer T, of sealable polyolefins, the minimum sealing temperature (initial sealing temperature) of the top layer T being at least 100° C. and being greater than the minimum sealing temperature of the intermediate layer I, and the thickness of the top layer T being less than 0.4 µm.

Surprisingly, the two sealing layers which are present one on top of the other and whose minimum sealing temperatures are matched with one another in the stated manner lead to a film which is improved compared with the prior art. This film no longer sticks to itself, to heated rolls or to the hot revolving clip chain of the transverse stretching frame. The production of the film is therefore substantially unproblematic compared with the film according to the prior art described.

Surprisingly, the processing behavior of the film according to the invention has not changed in comparison with the film according to the prior art as a result of applying the thin and higher-sealing top layer to the low-sealing intermediate layer. The film still has a very low initial sealing temperature and can still be used in applications in which the advantageous low initial sealing temperature of the polyolefin of the intermediate layer and all advantages associated therewith play a role. Surprisingly, it has been found that, in applications where the film is sealed by means of ribbed sealing jaws, it is possible to choose the same sealing temperatures as in the case where the thin top layers are absent. Evidently, the thin top layer is broken open by the ribbing of the sealing jaws, with the result that the sealing properties of the layer underneath are fully displayed.

DETAILED DESCRIPTION OF THE INVENTION

The base layer of the multilayer film according to the invention contains polyolefins, preferably propylene polymers, and, if required, further added additives in effective amounts in each case. In general, the base layer contains at least 50% by weight, preferably from 75 to 100% by weight, in particular from 90 to 98% by weight, of the propylene polymers, based in each case on the base layer.

The propylene polymer contains in general from 90 to 100% by weight, preferably from 95 to 100% by weight, in particular from 98 to 100% by weight, of propylene units and has in general a melting point of 120° C. or higher, preferably from 150° to 170° C., and in general a melt flow index of from 0.5 g/10 min to 8 g/10 min, preferably from 2 g/10 min to 5 g/10 min, at 230° C. and under a force of 21.6N (DIN 15 53 735). Isotactic propylene homopolymer having an atactic fraction of 15% by weight or less, copolymers of ethylene and propylene having an ethylene content of 10% by weight or less, copolymers of propylene with $C_4$–$C_8$-α-olefins having an α-olefin content of 10% by weight or less, terpolymers of propylene, ethylene and butylene having an ethylene content of 10% by weight or less and having a butylene content of 15% by weight or less or preferred propylene polymers for the base layer, isotactic propylene homopolymer being particularly preferred. The stated percentages by weight are based on the respective polymers.

A mixture of the stated propylene homopolymers and/or copolymers and/or terpolymers and other polyolefins, in particular of monomers having 2 to 6 carbon atoms, is also suitable, the mixture containing at least 50% by weight, in particular at least 75% by weight, of propylene polymer. Suitable polyolefins in the polymer mixture are polyethylenes, in particular HDPE, LDPE and LLDPE, the amount of each of these polyolefins not exceeding 15% by weight, based on the polymer mixture.

In a preferred embodiment of the film according to the invention, the propylene polymer of the base layer is peroxidically degraded.

A measure of the degree of degradation of the polymer is the so-called degradation factor A, which indicates the relative change in the melt flow index according to DIN 53 735 of the polypropylene, based on the starting polymer.

$$A = \frac{MFI_2}{MFI_1}$$

$MFI_1$=Melt flow index of the propylene polymer before the addition of the organic peroxide $MFI_2$=Melt flow index of the peroxidically degraded propylene polymer In general, the degradation factor A of the propylene polymer used is in a range from 3 to 15, preferably from 6 to 10. Particularly preferred organic peroxides are dialkyl peroxides, an alkyl radical being understood as meaning the usual saturated straight-chain or branched lower alkyl radicals having up to six carbon atoms. 2,5-Dimethyl-2,5-di(tert-butylperoxy)hexane or di-tert-butyl peroxide are particularly preferred.

In general, the base layer may contain stabilizers and neutralizing agents in effective amounts in each case and, if required, lubricants, antistatic agents and/or hydrocarbon resin.

In a white or opaque or white/opaque embodiment, the base layer additionally contains pigments or vacuole-initiating particles or a combination of these. Such films have a light transmittance according to ASTM-D 1033–77 of not more than 50%, preferably of not more than 70%.

Pigments comprise those particles which essentially do not lead to vacuole formation during orientation. The coloring effect of the pigments is caused by the particles themselves. The term "pigment" is in general associated with a particle size of from 0.01 to not more than 1 μm and covers both so-called "white pigments" which make the films white and "colored pigments" which impart a color to the film or make the film black. In general, the mean particle diameter of the pigments is in the range from 0.01 to 1 μm, preferably from 0.01 to 0.7 μm, in particular from 0.01 to 0.4 μm. The base layer contains pigments in general in an amount of from I to 25% by weight, in particular from 2 to 20% by weight, preferably from 5 to 15% by weight, based in each case on the base layer.

Conventional pigments are materials such as, for example, alumina, aluminum sulfate, barium sulfate, calcium carbonate, magnesium carbonate, silicates, such as aluminum silicate (kaolin clay) and magnesium silicate (talc), silica and titanium dioxide, among which white pigments such as calcium carbonate, silica, titanium dioxide and barium sulfate are preferably used.

The titanium dioxide particles comprise at least 95% by weight of rutile and are preferably used with a coating of inorganic oxides, as usually used as a coating for $TiO_2$ white pigment in papers or coating materials for improving the lightfastness. The particularly suitable inorganic oxides include the oxides of aluminum, silicon, zinc or magnesium or blends of two or more of these compounds. They are precipitated from water-soluble compounds, for example alkali metal aluminate, in particular sodium aluminate, aluminum hydroxide, aluminum sulfate, aluminum nitrate, sodium silicate or silica, in aqueous suspension. $TiO_2$ particles having a coating are described, for example, in EP-A-0 078 533 and EP-A-0 044 515.

If required, the coating also contains organic compounds having polar and nonpolar groups. Preferred organic compounds are alkanols and fatty acids having 8 to 30 carbon atoms in the alkyl group, in particular fatty acids and primary n-alkanols having 12 to 24 carbon atoms, and polydiorganosiloxanes and/or polyorganohydrogensiloxanes, such as polydimethylsiloxane and polymethylhydrogensiloxane.

The coating on the $TiO_2$ particles usually comprises from 1 to 12 g, in particular from 2 to 6 g, of inorganic oxides, and, if required, from 0.5 to 3 g, in particular from 0.7 to 1.5 g, of organic compounds, based in each case on 100 g of $TiO_2$ particles, are additionally present. It has proven particularly advantageous if the $TiO_2$ particles are coated with $Al_2O_3$ or with $Al_2O_3$ and polydimethylsiloxane.

Opaque embodiments of the films contain vacuole-initiating particles which are incompatible with the polymer matrix and, during the orientation of the films, lead to the formation of vacuole-like cavities, the size, type and number of vacuoles being dependent on the material and on the size of the solid particles and on the orientation conditions, such as orientation ratio and orientation temperature. The vacuoles give the films a characteristic perlescent, opaque appearance which is caused by light scattering at the vacuolelpolymer matrix interfaces. In general, the mean particle diameter of the vacuole-initiating particles is from 1 to 6 μm, preferably from 1.5 to 5 μm. The base layer contains vacuole-initiating particles in general in an amount of from 1 to 25% by weight, based on the weight of the base layer.

Conventional vacuole-initiating particles of the base layer are inorganic and/or organic materials incompatible with polypropylene, such as alumina, aluminum sulfate, barium sulfate, calcium carbonate, magnesium carbonate, silicates, such as aluminum silicate (kaolin clay) and magnesium silicate (talc), silica and titanium dioxide among which calcium carbonate, silica and titanium dioxide are preferably used. Suitable organic fillers are the usually used polymers which are incompatible with the polymers of the base layer, in particular those such as HDPE, polyesters, polystyrenes, polyamides and halogenated organic polymers, polyesters, such as, for example, polybutylene or polyethylene terephthalates, being preferred. For the purposes of the present invention, "incompatible materials or incompatible polymers" means that the material or the polymer is present in the film as a separate particle or as a separate phase.

White/opaque films which are provided with vacuole-initiating particles and with pigment contain the vacuole-initiating particles in an amount from 1 to 10% by weight, preferably from 1 to 5% by weight, and pigment in an amount of from 1 to 7% by weight, preferably from 1 to 5% by weight, based in each case on the weight of the base layer.

The density of the opaque or white films may vary within wide limits and depends on the type and the amount of filler. The density is in general in the range from 0.4 to 1.1 g/cm$^3$. Pigmented films have a density of the order of magnitude of 0.9 g/cm$^3$ or higher, preferably in the range from 0.9 to 1.1 g/cm$^3$. Films which contain only vacuole-initiating particles have a density of less than 0.9 g/cm$^3$. The density of packaging films containing from 2 to 5% by weight of vacuole-initiating particles is in the range from 0.6 to 0.85 g/cm$^3$. The density of films containing from 5 to 14% by weight of vacuole-initiating particles is in the range from 0.4 to 0.8 g/cm$^3$. Films which contain pigments and vacuole-initiating particles have a density in the range from 0.5 to 0.85 g/cm$^3$, depending on the ratio of pigment content to content of vacuole-initiating particles.

According to the invention, the multilayer film comprises at least one intermediate layer which in general is applied to at least one surface of the base layer. This intermediate layer contains from 75 to 100% by weight, preferably from 90 to 100% by weight, in particular from 95 to 100% by weight, based in each case on the intermediate layer, of sealable polymers of olefins having 2 to 10 carbon atoms and, if required, additives in effective amounts in each case. The minimum sealing temperature of these sealable polyolefins of the intermediate layer is less than the minimum sealing temperature of the polyolefin of the top layer. The minimum sealing temperature of the polymer of the intermediate layer is below 100° C., preferably below 90° C. and very preferably in the range of 65°–80° C.

Examples of such sealable olefinic polymers having a low initial sealing temperature are a copolymer of
  ethylene and propylene or
  ethylene and 1-butylene or
  propylene and 1-butylene or
a terpolymer of
  ethylene and propylene and 1 -butylene or
a mixture or a blend of two or more of the stated copolymers and terpolymers,
if required mixed with one or more of the stated copolymers and terpolymers, random ethylene/propylene copolymers having
  an ethylene content of from 1 to 10% by weight, preferably from 2.5 to 8% by weight, or
random propylene/1-butylene copolymers having
  a butylene content of from 2 to 25% by weight, preferably from 4 to 20% by weight,
  based in each case on the total weight of the copolymer, or
random ethylene/propylene/1-butylene terpolymers having
  an ethylene content of from 1 to 10% by weight, preferably from 2 to 6% by weight, and
  a 1-butylene content of from 2 to 20% by weight, preferably from 4 to 20% by weight,
  based in each case on the total weight of the terpolymer, or
a mixture of an ethylene/propylene/1-butylene terpolymer and a propylene/1-butylene copolymer
  having an ethylene content of from 0.1 to 7% by weight and a propylene content of from 50 to 90% by weight and a 1 -butylene content of from 10 to 40% by weight,
  based in each case on the total weight of the polymer mixture, being particularly preferred.

The copolymers and terpolymers described above have in general a melt flow index of from 1.5 to 30 g/10 min, preferably from 3 to 15 g/10 min. The mixture of copolymers and terpolymers described above has in general a melt flow index of from 5 to 9 g/10 min. The stated melt flow indices are measured at 230° C. and under a force of 21.6 N (DIN 53 735).

Among the polyolefins described above, the sealable propylene polymers whose propylene content is at least 70% by weight, preferably 75–98% by weight, based on the propylene polymer, are preferred. Preferred comonomers are ethylene and butylene.

If required, all intermediate layer polymers described above may be peroxidically degraded in the same manner as described above for the base layer, in principle the same peroxides being used. The degradation factor for the intermediate layer polymers is in general in a range from 3 to 15, preferably from 6 to 10.

In a preferred embodiment, the intermediate layer contains stabilizers and neutralizing agents and, if required, antiblocking agents, lubricants, hydrocarbon resins and/or antistatic agents, in effective amounts in each case. The addition of stabilizers, neutralizing agents and antiblocking agents is preferred.

The polyolefin film according to the invention comprises at least one sealable top layer, which is applied to the intermediate layer described above. This top layer contains from 75 to 100% by weight, preferably from 90 to 100% by weight, in particular 100% by weight, based in each case on the top layer, of sealable polymers of olefins having 2 to 10 carbon atoms and, if required, additives in effective amounts in each case. The minimum sealing temperature of the sealable polyolefins is at least 100° C. and is greater than the minimum sealing temperature of the polyolefin of the intermediate layer. The minimum sealing temperature of the top layer polymer is, according to the invention, at least 100° C., preferably from 100° to 150° C., in particular from 120° to 140° C.

Examples of such sealable olefinic polymers are a copolymer of
  ethylene and propylene or
  ethylene and 1-butylene or
  propylene and 1-butylene or
a terpolymer of
  ethylene and propylene and 1-butylene or
a mixture or a mixture of two or more of the stated copolymers and terpolymers, if required mixed with one or more of the stated copolymers and terpolymers,
random ethylene/propylene copolymers having an ethylene content of from 1 to 10% by weight, preferably from 2.5 to 8% by weight, or
random propylene/1-butylene copolymers having a butylene content of from 2 to 25% by weight, preferably from 4 to 20% by weight, based in each case on the total weight of the copolymer, or random ethylene/propylene/1-butylene terpolymers having an ethylene content of from 1 to 10% by weight, preferably from 2 to 6% by weight, and a 1-butylene content of from 2 to 20% by weight, preferably from 4 to 20% by weight, based in each case on the total weight of the terpolymer, or a blend of an ethylene/propylene/1-butylene terpolymer and a propylene/1-butylene copolymer having an ethylene content of from 0.1 to 7% by weight and a propylene content of from 50 to 90% by weight and a 1-butylene content of from 10 to 40% by weight, based in each case on the total weight of the polymer blend, being particularly preferred.

The copolymers and terpolymers described above have in general a melt flow index from 1.5 to 30 g/10 min, preferably from 3 to 15 g/10 min. The blend of copolymers and terpolymers described above has in general a melt flow index of from 5 to 9 g/10 min. All melt flow indices stated are measured at 230° C. and under a force of 21.6 N (DIN 53 735).

Among the polyolefins described above, the sealable propylene polymers whose propylene content is at least 70% by weight, preferably 75–98% by weight, based on the propylene polymer, are preferred. Preferred comonomers are ethylene and butylene.

If required, all top layer polymers described above may be peroxidically degraded in the same manner as described above for the base layer, in principle the same peroxides being used. The degradation factor for the top layer polymers is in general in a range from 3 to 15, preferably from 6 to 10.

In a preferred embodiment, the top layer contains stabilizers and neutralizing agents and, if required, lubricants in effective amounts in each case.

The multilayer film according to the invention comprises the base layer and intermediate layer described above and a top layer and, if required, further layers. Four-layer embodiments which have, on both sides, a top layer which may be identical or different with regard to their thickness and composition are preferred. Five-layer embodiments which have a base layer and intermediate layers applied to both sides of the base layer and top layers on both sides are also preferred. These films may have a symmetrical structure, i.e. with the same intermediate and top layers on both sides. If required, the intermediate layers or top layers on both sides may also differ from one another. Furthermore, six- and seven-layer films which have additional intermediate layers on one or both sides of the base are very advantageous. The six-layer film has an asymmetrical structure, and the seven-layer film has the advantage of a symmetrical structure.

The total thickness of the polyolefin multilayer film according to the invention may vary within wide limits and depends on the intended use. It is preferably from 3 to 150 $\mu$m, in particular from 5 to 120 $\mu$m, the base layer accounting for from about 30 to 90% of the total film thickness.

The thickness of the sealable top layer according to the invention is less than 0.4 $\mu$m and is preferably in the range below 0.3 $\mu$m, in particular in the range from 0.05 to 0.2 $\mu$m. It has been found that the advantageous influence of the intermediate layer on the sealing properties is all the more effective the thinner the top layer applied thereon. In the case of top layers of less than 0.4 $\mu$m, the film shows virtually the same processing behavior as a corresponding film without this top layer. Surprisingly, in the production of the film, the thin layer with the higher minimum sealing temperature is sufficient for effectively reducing the adhesion of the film to itself, to rolls and to other hot machine parts. Furthermore, if the thickness of the top layer exceeds 0.4 $\mu$m, no problems occur as a result of adhesion of the film, but the initial sealing temperature increases so that the sealing behavior of the intermediate layer is no longer the determining factor.

According to the invention, the initial sealing temperature of the polyolefin of the top layer is higher than the initial sealing temperature of the polyolefin of the intermediate layer. Preferably, the initial sealing temperatures of the polymers differ by at least more than 15° C., in particular by 20°–50° C., particularly preferably by 25°–35° C. For the purposes of the present invention, the initial sealing temperature of a polymer is the initial temperature which is measured on a comparative film which has, on both sides, 0.7 $\mu$m thick top layers comprising the polymer to be tested. The base layer and production process of this comparative film are analogous to the corresponding embodiment according to the invention, comprising intermediate layer and top layer of the two sealable polymers.

The optional top layer on the opposite side may be composed of non-sealing polyolefins and of sealable polyolefins. Particularly suitable polyolefins are those which were described as polyolefins for the base layer. The sealable polymers which were described for the intermediate layer and for the top layer are also particularly suitable. The thickness of this further top layer is in general from 0.1 to 5 $\mu$m, preferably from 0.5 to 2 $\mu$m.

The thickness of the intermediate layer according to the invention is in general from 0.2 to 10 $\mu$m, intermediate layer thicknesses of from 0.5 to 5 $\mu$m, in particular from 1 to 2 $\mu$m, being preferred.

As already stated for the respective layers, the multilayer film according to the invention may contain neutralizing agents, stabilizers, lubricants, antiblocking agents, hydrocarbon resins and/or antistatic agents in one or more layers. The following data in percent by weight are based on the weight of the respective layer to which the additive is added.

Neutralizing agents are preferably dihydrotalcite, calcium stearate and/or calcium carbonate having a mean particle size of not more than 0.7 $\mu$m, an absolute particle size of less than 10 $\mu$m and a specific surface area of at least 40 m$^2$/g. In general, the neutralizing agent is added in an amount of from 0.02 to 0.1% by weight.

The conventional stabilizing compounds for ethylene, propylene and other $\alpha$-olefin polymers may be used as stabilizers. The added amount thereof is from 0.05 to 2% by weight. Phenolic stabilizers, alkali metal/alkaline earth metal stearates and/or alkali metal/alkaline earth metal carbonates are particularly suitable. Phenolic stabilizers are preferred in an amount of from 0.1 to 0.6% by weight, in particular from 0.15 to 0.3% by weight, and with a molar mass of more than 500 g/mol. Pentaerythrityl tetrakis-3-(3, 5-di-tert-butyl4-hydroxyphenyl)propionate or 1,3,5-trimethyl-2,4,6-tris(3,5-di-tert-butyl-4-hydroxybenzyl) benzene are particularly advantageous.

Lubricants are higher aliphatic amides, higher aliphatic esters, waxes and metal soaps and polydimethylsiloxanes. The effective amount of lubricant is in the range from 0.1 to 3% by weight. The addition of higher aliphatic amides in the range of from 0.15 to 0.25% by weight to the base layer and/or the top layers is particularly suitable. A particularly suitable aliphatic amide is erucamide.

Suitable antiblocking agents are inorganic additives, such as silica, calcium carbonate, magnesium silicate, aluminum silicate, calcium phosphate and the like, and/or incompatible organic polymers, such as polyamides, polyesters, polycarbonates and the like, benzoguanamine/formaldehyde polymers, silica and calcium carbonate being preferred. The effective amount of antiblocking agent is in the range from 0.1 to 2% by weight, preferably from 0.1 to 0.5% by weight. The mean particle size is from 1 to 6 µm, in particular from 2 to 5 µm, particles having a spherical shape, as described in EP-A-0 236 945 and DE-A-38 01 535, being particularly suitable.

Hydrocarbon resins are low molecular weight polymers whose average molecular weight $M_w$ is in general in the range from 300 to 8,000, preferably from 400 to 5,000, preferably from 500 to 2,000. Thus, the average molecular weight $M_w$ of the resins is substantially lower than that of the propylene polymers which form the main component of the individual film layers and generally have an average molecular weight $M_w$ of more than 100,000. The hydrocarbon resins are preferably added to the base layer and/or to the intermediate layer or layers. The effective amount of low molecular weight resin is from 1 to 20% by weight, preferably from 2 to 10% by weight, based on the layer.

The recommended low molecular weight resin is a natural or synthetic resin having a softening point of from 60° to 180° C., preferably from 80° to 150° C., determined according to ASTM E-28. Among the many low molecular weight resins, the hydrocarbon resins are preferred, especially in the form of the petroleum resins, styrene resins, cyclopentadiene resins and terpene resins (these resins are described in Ullmanns Encyklopädie der technischen Chemie, 4th Edition, Volume 12, pages 525 to 555). Suitable petroleum resins are described in many publications, such as, for example, EP-A-0 180 087, which is hereby incorporated by reference.

Preferred antistatic agents are alkali metal alkanesulfonates, polyether-modified, i.e. ethoxylated and/or propoxylated, polydiorganosiloxanes (polydialkylsiloxanes, polyalkylphenylsiloxanes and the like) and/or the essentially straight-chain and saturated aliphatic, tertiary amines having an aliphatic radical of 10 to 20 carbon atoms which are substituted by ω-hydroxy-$(C_1-C_4)$-alkyl groups, N,N-bis(2-hydroxyethyl)alkylamines having 10 to 20 carbon atoms, preferably 12 to 18 carbon atoms, in the alkyl radical being particularly suitable. The effective amount of antistatic agent is in the range from 0.05 to 3% by weight. Glyceryl monostearate is also a preferred antistatic agent.

The invention furthermore relates to a process for the production of the multilayer film according to the invention by the coextrusion process known per se.

In this process, as is usual in the coextrusion process, the polymer or the polymer mixture of the individual layers is compressed and liquefied in an extruder, and any additives introduced may already be present in the polymer or in the polymer mixture or are added by the masterbatch technique. The melts corresponding to the individual layers of the film are then coextruded simultaneously through a sheet die (slot die) and the extruded multilayer film is taken off on one or more take-off rolls, whereupon it cools and solidifies.

The film thus obtained is then generally oriented longitudinally and transversely to the extrusion direction, which leads to orientation of the molecular chains. The stretching ratio is preferably from 4:1 to 7:1 in the longitudinal direction and preferably from 7:1 to 11:1 in the transverse direction. The longitudinal orientation is expediently carried out with the aid of two rolls running at different speeds corresponding on the desired orientation ratio, and the transverse stretching with the aid of a corresponding clip frame.

The biaxial orientation of the film is followed by heat-setting thereof (heat treatment), the film being kept at a temperature of from 100° to 160° C. for from about 0.5 to 10 s. The film is then wound up in a conventional manner by a winding means. It has proven particularly advantageous to keep the take-off roll or rolls, by means of which the extruded film is also cooled and solidified, at a temperature of from 20° to 90° C.

The temperatures at which the longitudinal and the transverse orientation are carried out may be varied. In general, the longitudinal orientation is preferably carried out at from 100° to 150° C. and the transverse orientation preferably at from 155° to 190° C.

As mentioned above, one surface or both surfaces of the film may, if required, be corona-treated or flame-treated by one of the known methods after the biaxial orientation.

In an expedient corona treatment, the film is passed between two conductor elements serving as electrodes, such a high voltage, generally alternating current voltage (from about 10 to 20 kV and from 20 to 40 kHz), being applied between the electrodes that spray or corona discharges can take place. As a result of the spray or corona discharge, the air above the film surface is ionized and reacts with the molecules of the film surface so that polar intercalations form in the essentially nonpolar polymer matrix.

For a flame treatment with a polarized flame (cf. U.S. Pat. No. 4,622,237), an electrical direct current voltage is applied between a burner (negative pole) and a cooling roll.

The magnitude of the applied voltage is from 500 to 3,000 V, preferably in the range from 1,500 to 2,000 V. The applied voltage greatly accelerates the ionized atoms, which strike the polymer surface with greater kinetic energy. The chemical bonds within the polymer molecule are more readily broken, and the formation of free radicals takes place more rapidly. The polymer is subjected to far less thermal stress than in the standard flame treatment, and it is possible to obtain films in which the sealing properties of the treated side are even better than those of the untreated side.

The invention is now illustrated in more detail with reference to embodiments.

EXAMPLE 1

A five-layer film having a total thickness of 40 µm and a TIBIT layer structure was produced by coextrusion and subsequent stepwise orientation in the longitudinal and transverse direction.

Before being wound up, the film was subjected to a one-sided corona treatment on the roll side. The roll side is that side of the film which rests on the first take-off roll. The surface tension on this side as a result of this treatment was from 39 to 40 mN/m. All layers contained 0.13% by weight of pentaerythrityl tetrakis4-(3,5-di-tert-butyl-4-hydroxyphenyl)-propionate (®Irganox 1010) for stabilization and 0.06% by weight of calcium stearate as a neutralizing agent.

The base layer B essentially comprised a polypropylene homopolymer having an n-heptane-soluble fraction of 4% by weight and a melting range of from 160° to 162° C. The melt flow index of the polypropylene homopolymer was 3.4 g/10 min at 230° C. and under a 21.6N load (DIN 53 735). The base layer contained 0.12% by weight of erucamide having a melting range of from 78° to 82° C. and 0.12% by weight of N,N-bisethoxyalkylamine (®Armostat 300).

The polyolefinic top layers T essentially comprised an ethylene/propylene/1-butene terpolymer containing 3.5% by weight of ethylene, 88.5% by weight of propylene and 8% by weight of 1-butene. The minimum sealing temperature of this polymer is 106° C. The top layers contained 0.33% by weight of a ceramic, spherical antiblocking agent having a mean particle diameter of 2 μm. The thickness of the top layers was 0.1 μm in each case.

The intermediate layers I essentially comprised a random propylene/1-butene copolymer (®Tafmer XR 110T) having a propylene content of 74.3 mol % and a 1-butene content of 25.7 mol %, based on the copolymer, and having a melting point of 110.6° C. and a recrystallization temperature of 60° C. The minimum sealing temperature of the copolymer is 75° C. The thickness of the intermediate layers was 1.5 μm.

The properties of the films according to the Examples and Comparative Examples are summarized in the Table below. The meanings are as follows:

Tendency of the film to stick during production
+: The film does not tend to stick
−: The film tends to stick
Sealing behavior of the film during processing
+: The film exhibits sealing behavior similar to that of films which are low-sealing according to the prior art.
−: The sealing behavior is inadequate.

The following comparative films were produced for the determination of the abovementioned minimum sealing temperature of intermediate layer polymers and top layer polymers:

EXAMPLE 1a

A three-layer film having a total thickness of 40 μm and a TBT layer structure was produced by coextrusion and subsequent stepwise orientation in the longitudinal and transverse directions.

Before being wound up, the film was subjected to a one-sided corona treatment on the roll side. The roll side is that side of the film which rests on the first take-off roll. The surface tension on this side as a result of this treatment was from 39 to 40 mN/m. All layers contained 0.13% by weight of pentaerythrityl tetrakis4-(3,5-di-tert-butyl4-hydroxyphenyl)-propionate (®lrganox 1010) for stabilization and 0.06% by weight of calcium stearate as a neutralizing agent.

The base layer B essentially comprised a polypropylene homopolymer having an n-heptane-soluble fraction of 4% by weight and a melting range of from 160° to 162° C. The melt flow index of the polypropylene homopolymer was 3.4 g/10 min at 230° C. and under a 21.6N load (DIN 53 735). The base layer contained 0.12% by weight of erucamide having a melting range of from 78° to 82° C. and 0.12% by weight of N,N-bisethoxyalkylamine (®Armostat 300).

The polyolefinic top layers T essentially comprised an ethylene/propylene/1-butene terpolymer containing 3.5% by weight of ethylene, 88.5% by weight of propylene and 8% by weight of 1-butene. The top layers contained 0.33% by weight of a ceramic, spherical antiblocking agent having a mean particle diameter of 2 μm. The thickness of the top layers was 0.7 μm in each case.

When T is sealed against T, the film has an initial sealing temperature of 106° C., which, for the purposes of the invention, is considered to be the minimum sealing temperature of the terpolymer.

EXAMPLE 1b

A three-layer film having a total thickness of 40 μm and a TBT layer structure was produced by coextrusion and subsequent stepwise orientation in the longitudinal and transverse directions.

Before being wound up, the film was subjected to a one-sided corona treatment on the roll side. The roll side is that side of the film which rests on the first take-off roll. The surface tension on this side as a result of this treatment was from 39 to 40 mN/m. All layers contained 0.13% by weight of pentaerythrityl tetrakis4-(3,5-di-tert-butyl4-hydroxyphenyl)propionate (®Irganox 1010) for stabilization and 0.06% by weight of calcium stearate as a neutralizing agent.

The base layer B essentially comprised a polypropylene homopolymer having an n-heptane-soluble fraction of 4% by weight and a melting range of from 160° to 162° C. The melt flow index of the polypropylene homopolymer was 3.4 g/10 min at 230° C. and under a 21.6N load (DIN 53 735). The base layer contained 0.12% by weight of erucamide having a melting range of from 78° to 82° C. and 0.12% by weight of N,N-bisethoxyalkylamine (®Armostat 300).

The polyolefinic top layers T essentially comprised a random propylene/1-butene copolymer (®Tafmer XR 110T) having a propylene content of 74.3 mol % and a 1-butene content of 25.7 mol %, based on the copolymer, and having a melting point of 110.6° C. and a recrystallization temperature of 60° C. The top layers contained 0.33% by weight of a ceramic, spherical antiblocking agent having a mean particle diameter of 2 μm. The thickness of the top layers was 0.7 μm in each case.

When T is sealed against T, the film has a minimum sealing temperature of 75° C., which, for the purposes of the present invention, is considered to be the minimum sealing temperature of the copolymer.

EXAMPLE 2

In comparison with Example 1, the base layer additionally contains 5% by weight of calcium carbonate having a mean particle size of about 1.5 μm and about 5% by weight of titanium dioxide of the rutile type. The film is white/opaque.

EXAMPLE 3

In comparison with Example 2, the film has further intermediate layers F on both sides of the base layer. In this case this is a symmetrical seven-layer film having a total thickness of 40 μm and a layer structure TIFBFIT. The polymer used for the further intermediate layers F was the same as that for the base layer B, but having a slightly higher MFI of 4.5 g/10 min. The thickness of the intermediate layer F is 4 μm. The film is white/opaque and has a glossy appearance.

COMPARATIVE EXAMPLE 1

In comparison with Example 1, the top layer thickness is now 0.5 μm. The processing behavior of the film is poor.

COMPARATIVE EXAMPLE 2

In comparison with Example 1, the top layer is now absent. The film tends to stick during production.

COMPARATIVE EXAMPLE 3

In comparison with Example 1, the minimum sealing temperature of the top layer is now 90° C. The film tends to stick during production.

The following measuring methods were used for characterizing the raw materials and films:

Melt Flow Index

The melt flow index was measured similarly to DIN 53 735 at 21.6N load and 230° C.

Melting Point

DSC measurement, maximum of the melting curve, heating rate 20° C./min.

Determination of the Initial Sealing Temperature of the Polymers

To determine the initial sealing temperature of the intermediate layer polymers and of the top layer polymers, films are produced analogously to the Examples according to the invention, but these films have only three layers. The top layers essentially comprise the polymer to be tested, i.e. the polymer of the intermediate layers of the Example according to the invention on the one hand and the polymer of the top layer of the Example according to the invention on the other hand. The top layers each have a thickness of about 0.7 μm. The initial sealing temperature of these comparative films is considered to be the initial sealing temperature of the polymer.

Determination of the Minimum Sealing Temperature (Initial Sealing Temperature) of the Films Heat-sealed samples (seal seam 20 mm×100 mm) are produced using the HSG/ET sealing apparatus from Brugger, by sealing a film at different temperatures with the aid of two heated sealing jaws at a sealing pressure of 10N/cm$^2$ and for a sealing time of 0.5 s. Test strips 15 mm wide were cut from the sealed samples. The T seal seam strength, i.e. the force required to separate the test strips, is determined using a tensile test machine at a take-off velocity of 200 mm/min, the plane of the seal seam being at right angles to the direction of tension. The minimum sealing temperature is the temperature at which a seal seam strength of at least 0.5N/15 mm is reached.

Seal Seam Strength

For the determination, two 15 mm wide film strips were placed one on top of the other and were sealed at 130° C. for a sealing time of 0.5 s and at a sealing pressure of 1.5N/mm$^2$ (apparatus: Brugger type NDS, sealing jaw heated on one side). The seal seam strength was determined by the T-peel method.

Friction

The friction was determined similarly to DIN 53 375. The coefficient of sliding friction was measured 14 days after production.

Surface Tension

The surface tension was determined by means of the so-called ink method (DIN 53 364).

Roughness

The roughness was determined according to DIN 4768, at a cutoff of 0.25 mm.

Haze

The haze of the film was measured according to ASTM D 1003-52. The haze measurement according to Holz was carried out similarly to ASTM-D 1003-52, but, in order to utilize the optimum measuring range, the measurement was carried out on four film layers one on top of the other and a 1° slit aperture was used instead of a 4° pinhole aperture.

Gloss

The gloss was determined according to DIN 67 530. The reflector value was measured as an optical characteristic for the surface of a film. Based on the standards ASTM-D 523-78 and ISO 2813, the angle of incidence was set at 20° or 60°. A light beam strikes the flat test surface at the set angle of incidence and is reflected or scattered by said surface. The light beams striking the photoelectronic receiver are displayed as a proportional electrical quantity. The measured value is dimensionless and must be stated together with the angle of incidence.

TABLE

| | | Minimum sealing temperature in °C. | | | Intermediate | Tendency of the | Sealing behavior |
|---|---|---|---|---|---|---|---|
| | Layer structure | Top layer polymer | Intermediate layer polymer | Top layer thickness μm | layer thickness μm | film to stick during production | of the film during processing |
| E1 | TIBIT | 106 | 75 | 0.1 | 1.5 | + | + |
| E2 | TIBIT | 106 | 75 | 0.1 | 1.5 | + | + |
| E3 | TIFBFIT | 106 | 75 | 0.1 | 1.5 | + | + |
| CE1 | TIBIT | 106 | 75 | 0.5 | 1.5 | + | − |
| CE2 | IBI | — | 75 | — | 1.0 | − | + |
| CE3 | TIBIT | 90 | 80 | 0.1 | 1.5 | − | + |

E: Example
CE: Comparative Example

We claim:

1. A polyolefinic multilayer film commising at least three layers BIT, wherein B is a polyolefinic base layer, I is an intermediate layer and T is a top layer, said top layer T applied to said intermediate layer I wherein said intermediate layer I comprises at least 75% by weight, based on the weight of the intermediate layer I, of heat sealable polyolefins and said top layer T comprises at least 75% by weight, based on the weight of top layer T, of heat sealable polyolefins and wherein the minimum sealing temperature of the polyolefin of the top layer T is at least 100° C. and is greater than the minimum sealing temperature of the polyolefin of the intermediate layer I and wherein the thickness of the top layer T is less than 0.4 μm.

2. The multilayer film as claimed in claim 1, wherein the polyolefin of the top layer T has a minimum sealing temperature of from 102° to 150° C. and a melt flow index of from 3 to 15 g/10 min.

3. The multilayer film as claimed in claim 1, wherein the polyolefin of the top layer T is
- a copolymer of
  - ethylene and propylene or
  - ethylene and 1-butylene or
  - propylene and 1-butylene or
- a terpolymer of
  - ethylene, propylene and 1-butylene; or
- a mixture of two or more of the stated copolymers and terpolymers.

4. The multilayer film as claimed in claim 1, wherein the thickness of the top layer T is less than 0.3 $\mu$m.

5. The multilayer film as claimed in claim 1, wherein the polyolefin of the intermediate layer I has a minimum sealing temperature below 95° C., and a melt flow index of from 3 to 15 g/10 min.

6. The multilayer film as claimed in claim 1, wherein the polyolefin of the intermediate layer I is
- a copolymer of
  - ethylene and propylene or
  - ethylene and 1-butylene or
  - propylene and 1-butylene; or
- a terpolymer of
  - ethylene, propylene and 1-butylene; or
- a mixture of two or more of the stated copolymers and terpolymers.

7. The multilayer film as claimed in claim 1, wherein the thickness of the intermediate layer I is from 0.2 to 10 $\mu$m.

8. The multilayer film as claimed in claim 1, wherein the top layer T is corona- or flame-treated.

9. The multilayer film as claimed in claim 1, wherein the base layer B further includes a further top layer T on the side opposite the intermediate layer I.

10. The multilayer film as claimed in claim 9, wherein the further top layer T essentially comprises a heat sealable or non-heat sealable polyolefin.

11. The multilayer film as claimed in claim 9, wherein the film further incudes intermediate layer I between the further top layer T and the base layer B.

* * * * *